Jan. 15, 1929.  1,699,490

C. E. McMANUS

CHANNEL FOR AUTOMOBILE WINDOWS AND WINDSHIELDS

Filed Jan. 8, 1927

Charles E. McManus INVENTOR

ATTORNEY

Patented Jan. 15, 1929.

1,699,490

UNITED STATES PATENT OFFICE.

CHARLES E. McMANUS, OF NEW YORK, N. Y., ASSIGNOR TO CROWN CORK & SEAL COMPANY, INC., OF NEW YORK, N. Y., A CORPORATION OF NEW YORK.

CHANNEL FOR AUTOMOBILE WINDOWS AND WINDSHIELDS.

Application filed January 8, 1927. Serial No. 159,756.

My invention relates to channels for automobile windows and wind shields, and more particularly to an article of this kind in which a fabricated strip is utilized as a protecting cushioning medium between the light of glass and the metal troughed portion of the channel so as to afford an effective protection for the glass and minimize likelihood of its breakage from the various shocks and jars to which glass about an automobile is subjected.

A channel embodying the invention includes therein a fabricated strip, the construction of which is such as to ensure an exact conformation of this strip with the glass, and with the troughed metal part of the channel, irrespective of slight surface irregularities in the glass or in said troughed portion, not only by reason of the resiliency inherent to the material of said strip, but because of the inclusion in the strip of strata having relatively different degrees of resiliency so as to permit not only the adjustment of opposite strata of the strip to irregularities in the part with which they contact, but to permit a bodily displacement of the stratum having the lower degree of resiliency when its adjustment to the surface with which it contacts requires a yielding of the material of this stratum in excess of its limit of resiliency.

The strip of fabricated material is so formed as to possess throughout waterproof properties which prevent deterioration by reason of the exposure of the strip to the elements.

The fabricated strip includes therein one surface stratum composed of composition cork and a second stratum of unvulcanized rubber, both of which strata by reason of their lack of tensile strength are firmly bonded to, what may be termed, a core of a textile fabric possessing a degree of resiliency sufficiently low to avoid stretch or attenuation of the strip in its entirety, but flexibility sufficient to permit distortion when the conditions of use require.

The invention consists primarily in a channel for automobile windows and wind shields embodying therein a troughed metal portion and a lining therefor composed of a fabricated strip having a textile core, a surface stratum of waterproof resilient material bonded to one side thereof, and a surface stratum of material having a relatively higher degree of resiliency than said other stratum bonded to the other side thereof; and in such other novel characteristics as are hereinafter set forth and described, and more particularly pointed out in the claims hereto appended.

Referring to the drawings.

Like letters refer to like parts throughout the several views.

Figure 1:
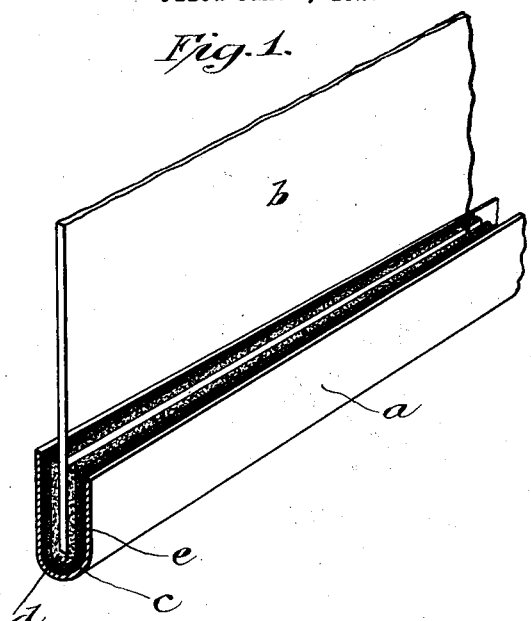
Fig. 1 is a perspective view of a channel for automobile windows and wind shields embodying the invention.
Figure 2:
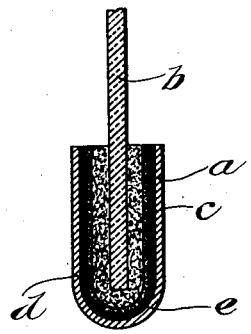
Fig. 2 is a cross-sectional view thereof upon an enlarged scale.
Figure 3:
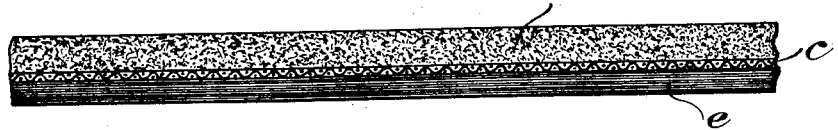
Fig. 3 is a view of a portion of the resilient fabricated strip.

In the embodiment of the invention shown in the drawings, the dimensions of the resilient strip are greatly exaggerated with relation to the thickness of the glass, as are the dimensions of the metallic trough itself, since in actual practice the fabricated strip will have a thickness of approximately only three thirty-seconds of an inch.

In the drawings, a portion of the usual metal trough $a$ of an automobile window or wind shield is indicated, and $b$ is the light of glass supported thereby. Within the trough $a$ is a strip of fabricated material folded about the edge of the glass $b$, and if desired cemented thereto. This strip consists of a non-elastic core $c$ of a suitable textile such as thin cotton duck, having upon one side thereof a thin facing stratum $d$ of composition cork, which composition cork consists of granular cork, the separate granules of which are firmly united by a suitable resilient binder or adhesive which may be unvulcanized rubber, or other binders commonly used in the production of composition cork; and upon the other side thereof, a thin facing strip $e$ of highly resilient material such as rubber, preferably unvulcanized rubber being used. In fact, as to the rubber facing, the textile core may be merely heavily frictioned. By using unvulcanized rubber for the facing stratum $e$, I not only secure a relatively higher degree of resilience in this facing than in the facing $d$, but secure a surface which will readily conform with and adhere to the wall of the metal trough $a$.

In the stratum $d$, I may employ cork granules formed from low grade cork and of dimensions sufficiently small to make this material a waste product in the production of articles of higher grade composition cork. While this composition cork with its elastic binder possesses considerable resiliency, this resiliency is low as compared with the surface stratum $e$, so that in fitting the strip to the edge of the glass and mounting it within the channel $a$, surface irregularities in the glass or in the stratum $d$ will be compensated for in part by compression of, and in part by physical displacement of portions of the surface $d$ and of the core $c$, and by localized compression of the surface $e$.

The exposed face of the composition cork stratum $d$ has a pebbled effect, due to the fact that after the composition has been rolled upon the core $c$, there will be irregular expansion of some of the cork granules when the pressure from this roller is relieved. This roughened surface has been found highly desirable in actual practice as it ensures not only a tight fit with the glass $b$, but facility in applying the strip to the glass and to the trough $a$.

In the production of the material from which the strips are cut, the composition cork facing stratum $d$ is firmly bonded to the fabric core $c$, the binding medium relied upon being either that which is incorporated in the composition cork, or an ordinary adhesive or binder applied to the fabric core $c$.

If desired, lampblack or other colored pigment may be admixed with the cork composition, but this is merely a matter of finish and is not essential to the invention. To give a little better finish to the stratum $d$, this surface may be given a coating of shellac, this however being also optional.

In applying the strip to the glass $b$ and to the trough $a$ it is the ordinary practice to cement the stratum $d$ to the glass $b$, and the stratum $e$ to the trough $a$. This practice is preferable, but is not essential to the invention.

The essentials of the invention are the employment in a channel for automobile windows and wind shields of a metallic trough for a light of glass supported from this trough, and a cushioning strip between the said trough and said light of glass, and if desired, cemented to both, which strip has a surface stratum of composition cork or other equivalent resilient material engaging the glass and bonded to a textile fabric core having bonded thereto upon its other face a stratum of unvulcanized rubber contacting with the metallic trough.

As heretofore stated, the dimensions shown in the drawings are grossly exaggerated and much enlarged in order to clearly distinguish the constituent parts of the strip. Ordinarily the strip of cushioning material will range from three to five thirty-seconds of an inch, the fabric being very light stock. The composition cork stratum $d$ is relatively thicker than the rubber stratum $e$, and both of these are relatively thicker than the fabric.

It is therefore not my intention to limit the invention to the proportions shown in the drawings.

Having described the invention, what I claim as new and desire to have protected by Letters Patent, is:—

1. A channel for automobile windows and wind shields embodying therein a troughed metal portion and a lining therefor composed of a fabricated strip having a textile core, a surface stratum of waterproof resilient material bonded to one side thereof, and a surface stratum of material having a relatively higher degree of resiliency than said other stratum bonded to the other side thereof.

2. A channel for automobile windows and wind shields embodying therein a troughed metal portion and a lining therefor composed of a fabricated strip having a textile core, a surface stratum of cork granules bonded together and to one side thereof, and a surface stratum of soft rubber bonded to the other side thereof.

3. A channel for automobile windows and wind shields embodying therein a troughed metal portion and a lining therefor composed of a fabricated strip having a textile core, a surface stratum of cork granules bonded together and to one side thereof, and a surface stratum of unvulcanized rubber bonded to the other side thereof.

In witness whereof I have hereunto affixed my signature, this 3d day of January, 1927.

CHARLES E. McMANUS.